(12) United States Patent
Kim et al.

(10) Patent No.: US 7,167,612 B2
(45) Date of Patent: Jan. 23, 2007

(54) WAVELENGTH TUNABLE FILTER CAPABLE OF BEING BIDIRECTIONALLY DRIVEN BY ELECTROMAGNETIC FORCES

(75) Inventors: Chang Kyu Kim, Daejeon-Shi (KR); Myung Lae Lee, Daejeon-Shi (KR); Chang Auck Choi, Daejeon-Shi (KR); Chi Hoon Jun, Daejeon-Shi (KR)

(73) Assignee: Electronics and Telecommunications Research Institute, Daejeon-shi (KR)

( * ) Notice: Subject to any disclaimer, the term of this patent is extended or adjusted under 35 U.S.C. 154(b) by 122 days.

(21) Appl. No.: 10/745,641

(22) Filed: Dec. 29, 2003

(65) Prior Publication Data
US 2004/0228575 A1 Nov. 18, 2004

(30) Foreign Application Priority Data
May 12, 2003 (KR) ............... 10-2003-0029763

(51) Int. Cl.
G02B 6/26 (2006.01)
G02B 6/42 (2006.01)
G02B 27/00 (2006.01)
G02B 1/10 (2006.01)
G02B 5/28 (2006.01)

(52) U.S. Cl. .............. 385/18; 385/15; 385/16; 359/577; 359/578; 359/579; 359/580; 359/584; 359/585; 359/586; 359/588; 359/589; 359/590

(58) Field of Classification Search .......... 385/15, 385/16, 18; 359/577–580, 584–586, 588–590
See application file for complete search history.

(56) References Cited

U.S. PATENT DOCUMENTS 4,421,381 A * 12/1983 Ueda et al. .............. 359/214

(Continued)

FOREIGN PATENT DOCUMENTS

KR 2001-04464 1/2001

(Continued)

OTHER PUBLICATIONS

Carlos F.R. Mateus, et al.; "Widely Tunable Torsional Optical Filter"; IEEE Photonics Technology Letters, vol. 14; No. 6; Jun. 2002; pp. 819-821.

*Primary Examiner*—Frank G. Font
*Assistant Examiner*—Derek L. Dupuis
(74) *Attorney, Agent, or Firm*—Mayer Brown Rowe & Maw LLP

(57) ABSTRACT

A wavelength tunable filter capable of being driven such that reflecting mirrors move more distant as well as closer by using the principle that a direction of the electromagnetic forces changes depending on the direction of the current flowing perpendicular to the external magnetic field. According to the wavelength tunable filter of the present invention, when it is necessary to have the wavelength tuning range and mechanical structure similar to the conventional wavelength tunable filter driven in only one direction, it is possible to lower the maximum force needed to drive the filter to a half, and reduce a probability that a pull-in phenomenon occurs. On the other hand, it is possible to reduce a wavelength change time of the element by increasing a resonant frequency when the same wavelength tuning ranges are implemented by using the same maximum driving forces.

8 Claims, 7 Drawing Sheets

U.S. PATENT DOCUMENTS

| | | |
|---|---|---|
| 6,341,039 B1 | 1/2002 | Flanders et al. |
| 6,351,577 B1 * | 2/2002 | Aksyuk et al. ............... 385/15 |
| 2002/0118429 A1 * | 8/2002 | Miyajima et al. ........... 359/224 |
| 2002/0167730 A1 * | 11/2002 | Needham et al. ........... 359/578 |
| 2003/0169786 A1 * | 9/2003 | Kapon et al. ................. 372/20 |
| 2005/0094964 A1 * | 5/2005 | Sato ........................... 385/147 |
| 2005/0105849 A1 * | 5/2005 | Kim et al. .................... 385/33 |

FOREIGN PATENT DOCUMENTS

| | | | |
|---|---|---|---|
| KR | 1020010004464 | * | 1/2001 |

* cited by examiner

WAVELENGTH TUNABLE FILTER CAPABLE OF BEING BIDIRECTIONALLY DRIVEN BY ELECTROMAGNETIC FORCES

BACKGROUND OF THE INVENTION

1. Field of the Invention

The present invention relates to a wavelength tunable filter for inputting or outputting a required wavelength of light in a WDM optical communication system, and more particularly to a wavelength tunable filter capable of being bidirectionally driven by electromagnetic forces.

2. Description of the Prior Art

In a Wavelength Division Multiplexing (WDM) optical communication system, a variety of channels having different wavelengths are transmitted via a single optical fiber, and thus it is necessary to have a procedure for combining or dividing a required wavelength of light at each end point and each branch point. For this purpose, a wavelength filter has been adapted. The wavelength filter can be classified into the one type in which the transmission wavelength is fixed for each element and the other type in which the transmission wavelength is adjustable by a single element.

In the one type in which the selectable wavelength is fixed, it has a high reliability. However, since it is necessary to prepare the same number of element arrays as that of channels at each branch point, it costs a lot to manufacture and maintain the filters as the number of channels is getting larger. On the contrary, in the other type in which the wavelength is adjustable, it is possible to select a variety of wavelengths by a single element so that a system size can be small and the cost for the manufacturing and the maintenance can be reduced. Accordingly, the former pertains to a high capacity system which processes a large amount of data simultaneously, whereas the latter pertains to a terminal which processes a small number of channels.

On the other hand, in an optical communication system, it is required to reserve spare elements in preparation for the case that a certain channel becomes unavailable due to defects or malfunctions. In the one type in which the selectable wavelength is fixed, it is needed to supplement all spare elements corresponding to each of channels. On the contrary, in the other type in which the wavelength is adjustable, it is possible to back up the entire channels by just a few elements.

Among the wavelength tunable filters, the most commonly used one is a Fabry-Perot resonator, in which two reflecting mirrors are disposed to face each other and the transmitted wavelength varies by adjusting the distance between the two reflecting mirrors.

Recently, a Fabry-Perot type wavelength tunable filter has been manufactured by using a Micro-Electro-Mechanical System (MEMS) technology in order to minimize the sizes of elements and the power consumption. Such a wavelength tunable filter adapting MEMS technology is constructed so as to adjust the distance between reflecting mirrors by means of the electrostatic forces generated by applying voltages to reflecting mirrors. For this reason, it has been studied much and commercialized recently. However, since only attractive forces are exerted in the element driven by electrostatic forces so that there may be a pull-in phenomenon in which both reflecting mirrors become stuck to each other when the distance between the reflecting mirrors reaches ⅔ or less than that of an equilibrium state, several methods of driving the reflecting mirrors to become more distant have been studied to prevent such a pull-in phenomena.

As an example, there is a method of using leverage, in which reflecting mirrors and electrodes are disposed on opposite sides of a lever and electrostatic forces are exerted between the electrodes on one side of the lever and bottom substrate to pull each other so that the reflecting mirror on the opposite side goes away from the substrate. This method has the advantage in that the distance from the pivot to the reflecting mirror is made to be larger than that from the pivot to the electrode so as to set the displacement of the reflecting mirror to be exaggerated than that of the electrode. Accordingly, there is no pull-in phenomenon since the displacement of the electrode necessary to move the reflecting mirror through the same length decreases in comparison with the existing method in which the reflecting mirror and the electrode are integrated in a single body.

As another example, there is a method in which a reflecting mirror, another reflecting mirror combined with an electrode and another electrode are sequentially disposed and electrostatic forces are exerted between electrodes to pull each other so that the distance between reflecting mirrors becomes longer. In such a method, it is possible to prevent a pull-in phenomenon because the distance between two electrodes can be sufficiently set to be 3 or more times larger than the required moving distance of the middle reflecting mirror. In other words, since the distance between two electrodes is set to be larger than that between reflecting mirrors, there is no pull-in phenomenon even if the displacement of the middle reflecting mirror is in the range of the pull-in phenomenon when both mirrors move closer.

All the conventional wavelength tunable filters including these methods have been designed such that the reflecting mirror moves in only one direction. For example, in case variable range of $2 \times \Delta\lambda$ nm centered to the wavelength of $\lambda_0$ nm is needed, the reflecting mirror stays at a certain position corresponding to $\lambda_0 + \Delta\lambda$ nm (or $\lambda_0 - \Delta\lambda$ nm) in an equilibrium state, and moves to the other position corresponding to $\lambda_0 - \Delta\lambda$ nm (or $\lambda_0 + \Delta\lambda$ nm) in response to external forces. This is because only the attractive force is available among electrostatic forces.

In the aforementioned construction, the maximum displacement from the equilibrium position becomes twice in comparison with the method which uses both directions that the reflection mirrors become more distant as well as closer. Further, in the spring structure typically adapted to the wavelength tunable filter using MEMS technology, since the displacement is proportional to the applied force, the required force becomes twice, too. In addition, supposing the distance that the reflecting mirror moves in order to alter the transmission wavelength by $\Delta\lambda$ is defined as d (here, $d<\lambda_0$) and the wavelength variation is nearly proportional to the distance variation of the reflecting mirror, the ratio of "the reduction of the distance between reflecting mirrors" to "the distance in an equilibrium state" becomes $$\frac{2d}{\lambda_0 + d}$$

for the conventional method in which the reflecting mirrors only move closer, which is larger than $$\frac{d}{\lambda_0}$$

for the method in which reflecting mirror moves bidirectionally. Therefore, the probability that a pull-in phenomenon occurs for the unidirectional method is higher than that for the bidirectional method. Besides, in case the same driving force and the same wavelength tunable range are used, since a resonant frequency of the resonator must be designed to be lower in comparison with the bidirectional driving structure, the time necessary to accomplish a same wavelength change increases.

SUMMARY OF THE INVENTION

The present invention is contrived to solve the above problems and an object of the present invention is to provide a Fabry-Perot type wavelength tunable filter capable of being driven in both directions that the distance between reflecting mirrors becomes more distant as well as closer from a central wavelength position.

In order to achieve the above object, according to one aspect of the present invention, a wavelength tunable filter capable of being bidirectionally driven comprises: two optical fibers or waveguides of which optical axes are aligned; lenses for an input light and an output light disposed between the optical fibers or waveguides; reflecting mirrors disposed between the lenses, the reflecting mirrors facing each other and being spaced by air gaps; elastic bodies for supporting at least one of reflecting mirrors at both sides thereof; at least one of spacers for maintaining a distance between the reflecting mirrors; at least one of conductor patterns going via the elastic body and the reflecting mirror in order to conduct current; electrode portions connected with each ends of the conductor pattern; and at least one of permanent magnets or electromagnets for forming a magnetic field which is perpendicular to the conductor pattern and in parallel with the surface of the reflecting mirror.

According to another aspect of the present invention, a wavelength tunable filter capable of being bidirectionally driven comprises: two optical fibers or waveguides of which optical axes are aligned; lenses for an input light and an output light disposed between the optical fibers or waveguides; reflecting mirrors disposed between the lenses, the reflecting mirrors facing each other and being spaced by air gaps; at least one of elastic bodies for supporting at least one of reflecting mirrors at one side thereof; at least one of spacers for maintaining a distance between the reflecting mirrors; at least one of conductor patterns going via the elastic body and the reflecting mirror except for portions through which lights pass in order to conduct current to one side circulating direction; electrode portions connected with each ends of the conductor pattern; and at least one of permanent magnets or electromagnets disposed in parallel with the optical fiber or waveguide adjacent to at least one of reflecting mirrors.

According to still another aspect of the present invention, a wavelength tunable filter capable of being bidirectionally driven comprises: two optical fibers or waveguides of which optical axes are aligned; lenses for an input light and an output light disposed between the optical fibers or waveguides; reflecting mirrors disposed between the lenses, the reflecting mirrors facing each other and being spaced by air gaps; elastic bodies for supporting the reflecting mirrors; at least one of spacers for maintaining a distance between the reflecting mirrors; at least two of conductor patterns going via each set of the elastic body and the reflecting mirror in parallel with each other; and electrode portions connected with each ends of the conductor patterns.

In the aforementioned, it is preferred that the reflecting mirror is a distributed Bragg reflector, or a two or three dimensional photonic crystalline structure. Also, the reflecting mirror is made of at least one of a metallic thin film, a dielectric thin film, an organic thin film and a semiconductor thin film, a combination of the aforementioned materials, or a combination of the aforementioned materials and air gaps.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF PREFERRED EMBODIMENTS

Figure 1:
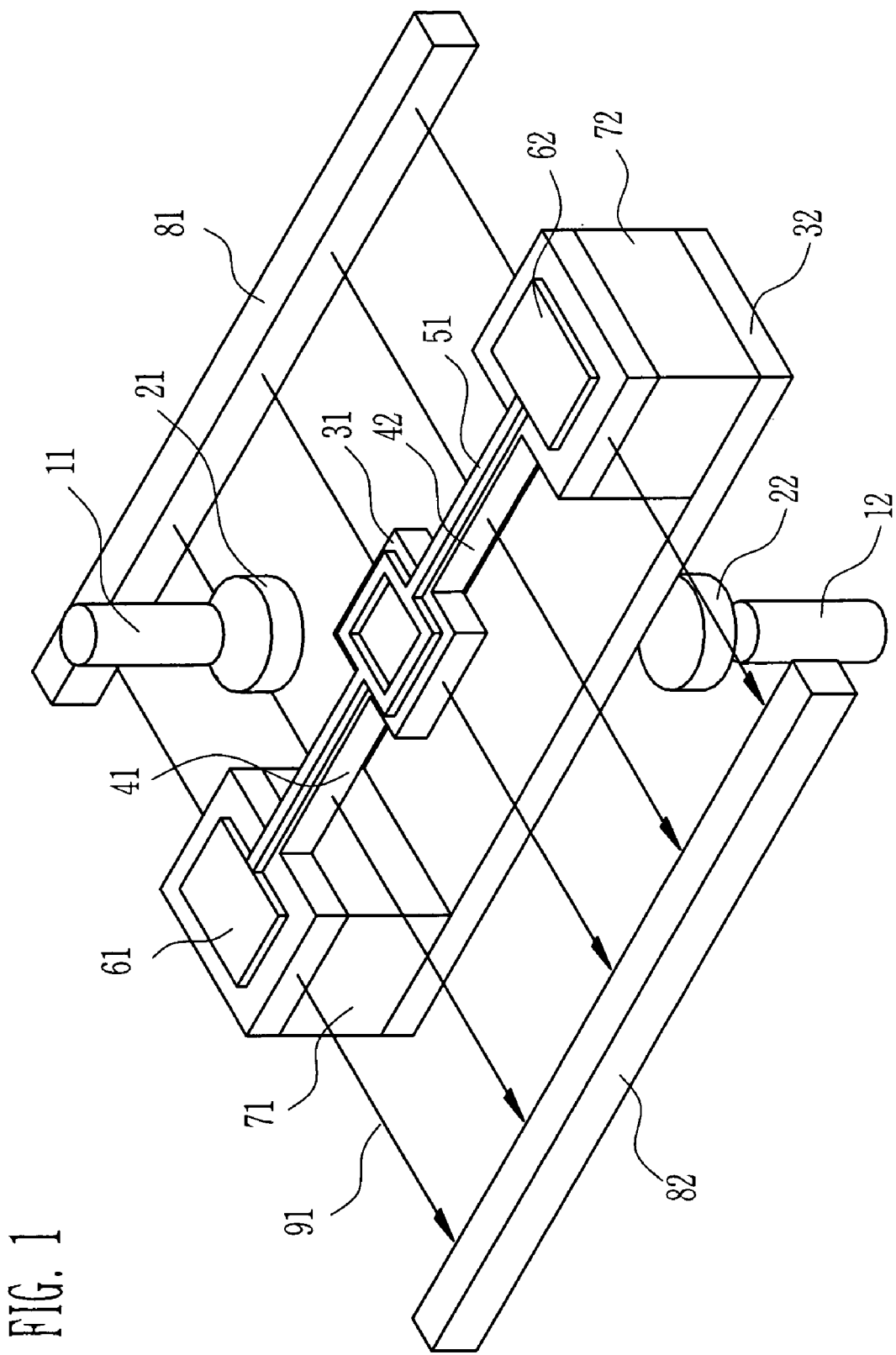
FIG. 1 is a structural diagram showing a wavelength tunable filter capable of being bidirectionally driven according to the first embodiment of the present invention.

The present invention will be described in detail by way of a preferred embodiment with reference to accompanying drawings, in which like reference numerals are used to identify the same or similar parts.

FIG. 1 is a structural diagram of the wavelength tunable filter bidirectionally driven according to the first embodiment of the present invention.

Two optical fibers or waveguides 11, 12 of which optical axes are aligned are separately situated in a predetermined distance. Lenses 21, 22 for focusing lights are situated at the front ends of the optical fibers or waveguides 11, 12. Between lenses 21, 22, there are a couple of reflecting mirrors 31, 32 facing each other and spaced by air gaps. The reflecting mirrors 31, 32 are aligned with the optical axis and both sides of the upper reflecting mirror 31 are supported by elastic bodies 41, 42. A lower reflecting mirror 32 has a length elongated to both ends of the elastic bodies 41, 42. Spacers 71, 72 are interposed between each end of the elastic body 41, 42 and each end of the lower reflecting mirror 32, respectively, so that a constant distance is maintained between reflecting mirrors 31, 32 in the state of no external forces. A conductor pattern 51 for carrying currents is formed on the surface of the upper reflecting mirror 31, and electrode portions 61, 62 are formed at both ends of the conductor pattern 51. Permanent magnets or electromagnets 81, 82 for producing magnetic fields 91 perpendicular to the conductor pattern 51 are installed in the proximity of both sides of the conductor pattern 51.

Light incident through an optical fiber or waveguide 11 at the input terminal is collimated by the lens 21 and then pass through a Fabry-Perot resonator consisting of the reflecting mirrors 31, 32 so that only the light having resonant wavelength of $\lambda_{FP}$ determined by the effective cavity length $L_{eff}$ can be transmitted. The relation between the effective cavity length and the resonant wavelength is defined as the following equation 1. The lights passing through the Fabry-Perot resonator are focused by the opposite lens 22 and then incident to the optical fiber or waveguide 12 in an output terminal.

$$L_{eff} = m \times \frac{\lambda_{FP}}{2} \quad \text{[Equation 1]}$$

here, m is the natural number.

The example in FIG. 1 is given for a bar spring structure in which both sides of the reflecting mirror 31 are connected with the elastic bodies 41, 42. However, any type of elastic structures can be alternatively adapted if it satisfies the condition that the reflecting mirror 31 moves along the optical axis and the current flows perpendicular to it. In addition, the example is given for the structure that the only one reflecting mirror 31 is connected with the elastic bodies 41, 42 and the other reflecting mirror 32 is fixed to the spacers 71, 72. However, alternatively, both reflecting mirrors 31, 32 can be connected with the elastic bodies so as to move simultaneously.

According to the present invention, the Lorentz force is used in order to adjust the distance between reflecting mirrors 31, 32 bidirectionally. The Lorentz force is a force which is induced, with respect to electric charges crossing the external magnetic field perpendicularly, in a perpendicular direction to the magnetic field and the moving direction of the electric charges at the same time. Accordingly, it is possible to reversely convert the direction of forces exerted to the reflecting mirror by altering the direction of the current in a fixed magnetic field or the direction of the magnetic field in a fixed current. The example in FIG. 1 is given for the method of altering the direction of the current in a fixed magnetic field. For this purpose, the conductor pattern 51 is formed on a certain surface of the reflecting mirror 31 connected with the elastic bodies 41, 42 on its both sides, and the electrode portions 61, 62 are formed on both outer ends of the elastic bodies 41, 42. The electrode portions 61, 62 receive the currents from an external power supply through conducting wires. Preferably, the conductor pattern is not overlapped with the optical beam path, that is, the central portion of the reflecting mirror 31, in order to prevent the light absorption by the conductor pattern 51. The external magnetic field is formed by the two permanent magnets or electromagnets 81, 82, whereby the magnetic flux 91 and the conductor pattern 51 are perpendicular in a same plane. Supposing the external magnetic field is B, the force $dF_B$ given to the unit length dL of the conductor pattern 51 having the current i can be defined as the following equation 2.

$$dF_B = idL \times B \quad \text{[Equation 2]}$$

Referring to FIG. 1, when the magnetic flux lines are set to travel from the back to the front, that is, from the permanent magnet or electromagnet 81 to the permanent magnet or electromagnet 82, the conductor pattern 51 receives a downward force if the current flows from the left electrode portion 61 to the right electrode portion 62, whereas the conductor pattern 51 receives an upward force if the current flows from the right electrode portion 62 to the left electrode portion 61. Since the strength of the force is proportional to the intensity of the magnetic field and the flowing current amount, it is possible to obtain a required transmission wavelength by adjusting the direction and the amount of the current.

Figure 2:
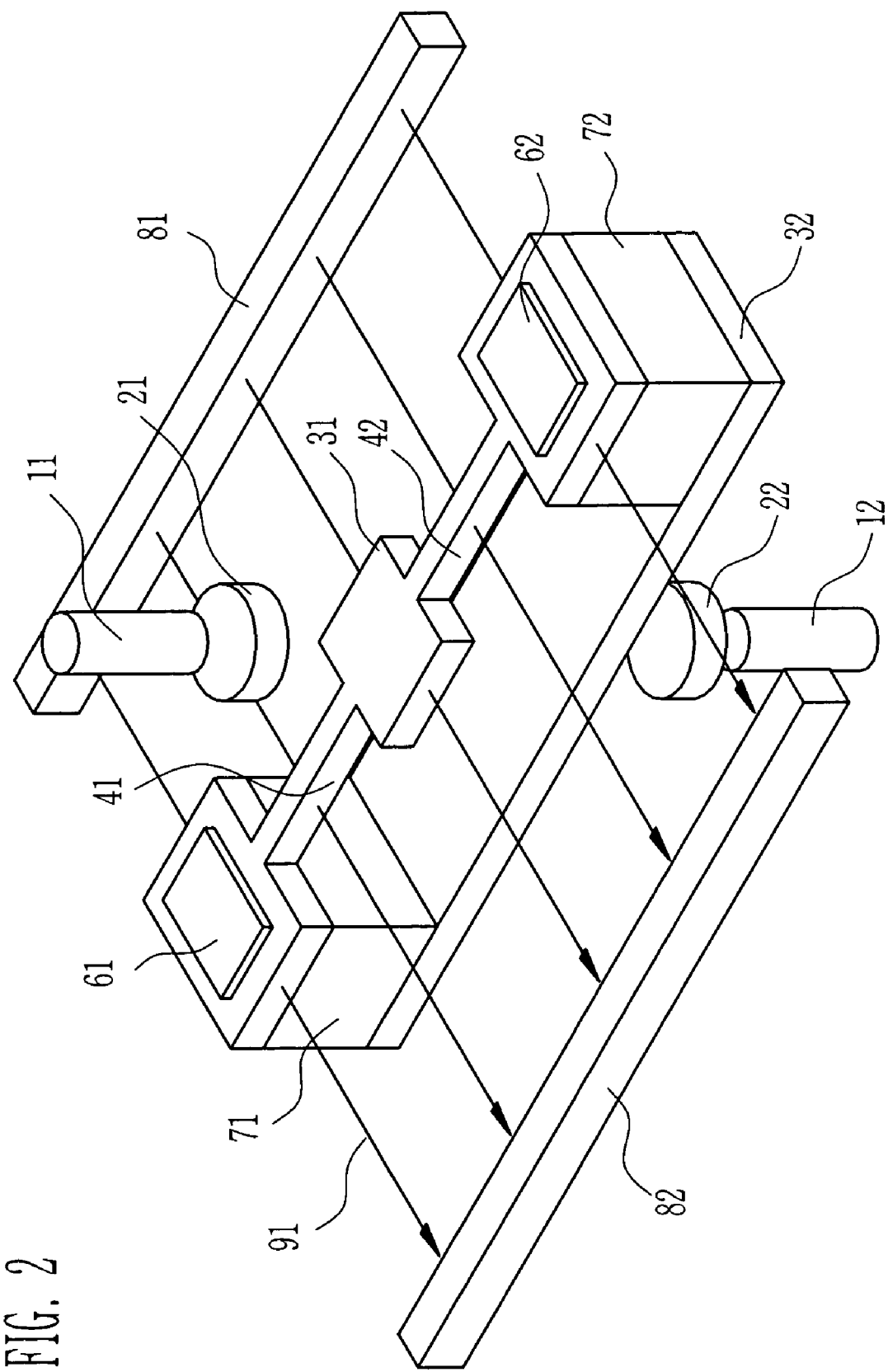
FIG. 2 is a structural diagram showing a wavelength tunable filter capable of being bidirectionally driven according to the second embodiment of the present invention.

If the reflecting mirror 31 and the elastic bodies 41, 42 are made of a doped semiconductor as an example to have a conductivity, it is possible to enable the current to directly flow through the elastic bodies 41, 42 and the reflecting mirror 31 between them without any conductor pattern as shown in FIG. 2.

Figure 3:
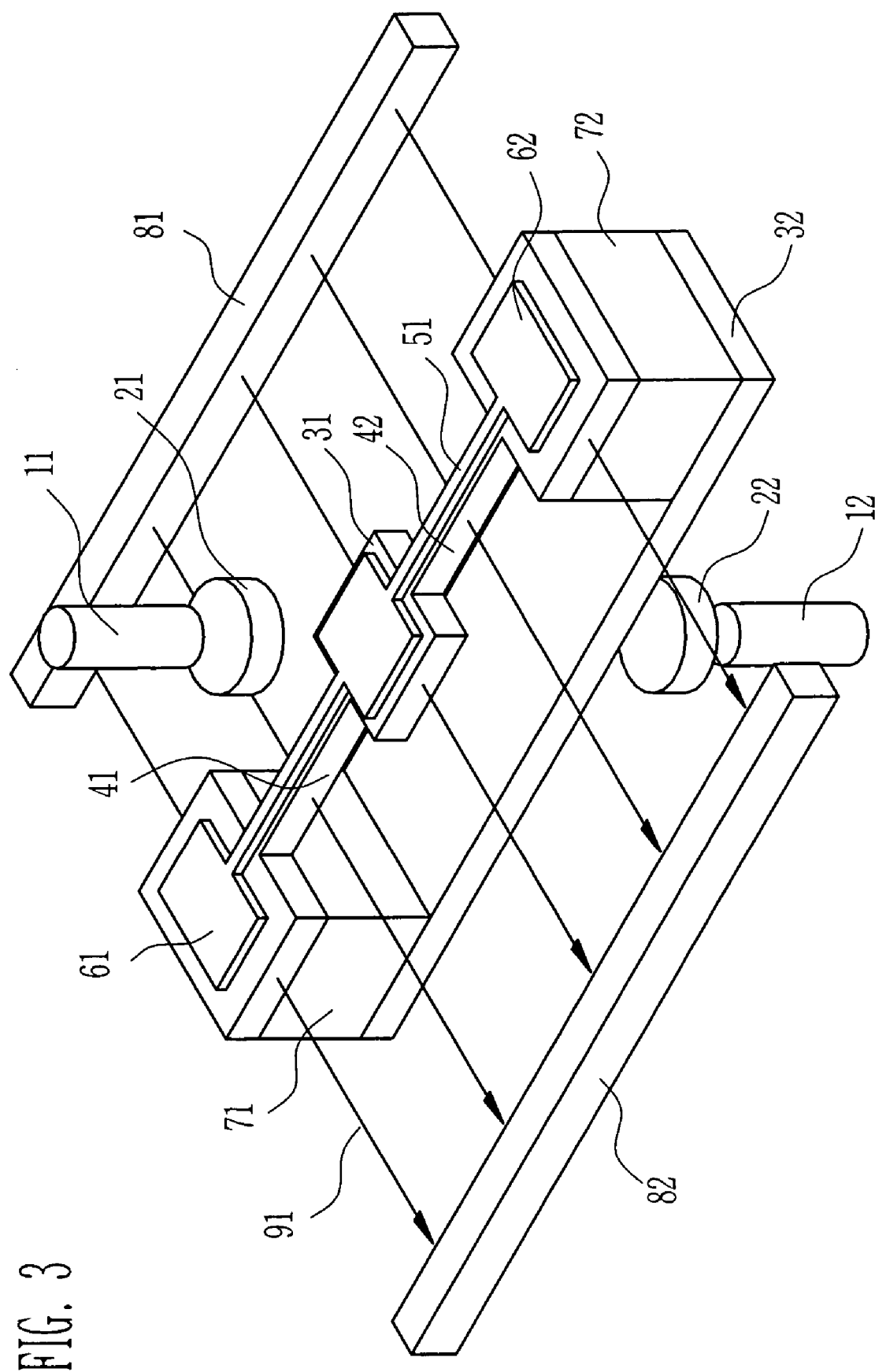
FIG. 3 is a structural diagram showing a wavelength tunable filter capable of being bidirectionally driven according to the third embodiment of the present invention.

In addition, if the light absorption for the required wavelength is ignorable in the conductor pattern 51, the conductor pattern 51 can be formed on the entire surface of the reflecting mirror 31 as shown in FIG. 3.

The reflecting mirrors 31, 32 and the elastic bodies 41, 42 are made of the same or different materials. And, for example, the reflecting mirrors 31, 32 can be a distributed Bragg reflector (DBR), or a two or three dimensional photonic crystal structure. In addition, the reflecting mirrors 31, 32 can be made of any one of a metallic thin film, a dielectric thin film, an organic thin film and a semiconductor thin film, a combination of the aforementioned materials, or a combination of the aforementioned materials and air gaps.

Figure 4:
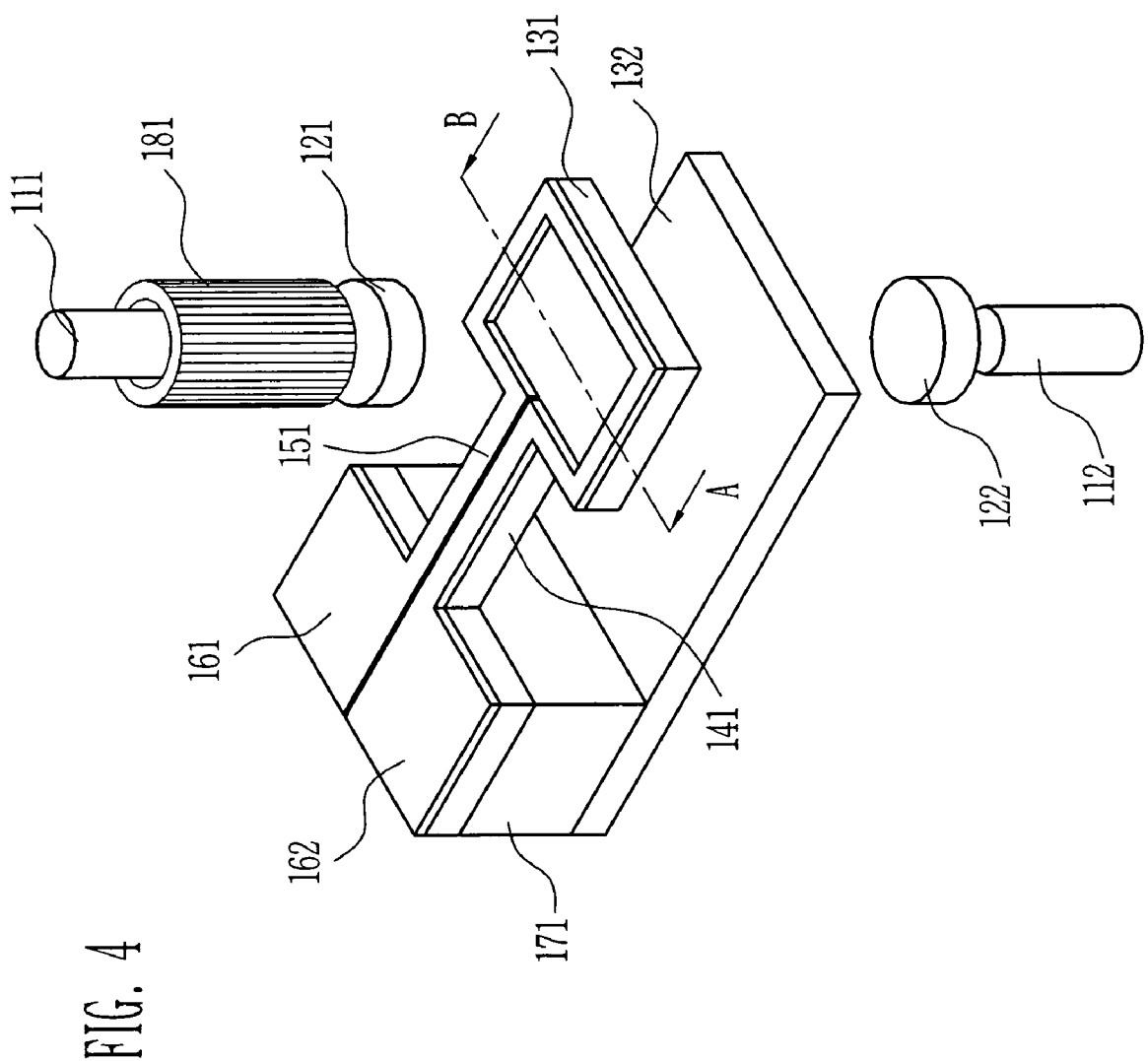
FIG. 4 is a structural diagram showing a wavelength tunable filter capable of being bidirectionally driven according to the fourth embodiment of the present invention.

FIG. 4 is a structural diagram illustrating a wavelength tunable filter driven bidirectionally according to the fourth embodiment of the present invention. Referring to FIG. 4, there is shown a wavelength tunable filter driven bidirectionally as a cantilever structure in which only one side of the reflecting mirror is supported by the elastic body and only one electromagnet or permanent magnet 181 is used.

Two optical fibers or waveguides 111, 112 of which optical axes are aligned are separately situated in a predetermined distance and two lenses 121, 122 for focusing lights are situated at the front ends of the optical fibers or waveguides 111, 112. Between lenses 121, 122, there are a couple of reflecting mirrors 131, 132 facing each other and spaced by air gaps. An upper reflecting mirror 131 is aligned with the optical axis and one side of the upper reflecting mirror 131 is supported by elastic body 141. The lower reflecting mirror 132 has a length elongated to the end of the elastic body 141. A spacer 171 is interposed between the end of the elastic body 141 and the end of the lower reflecting mirror 132 so that a constant distance is maintained between reflecting mirrors 131, 132 in the state of no external forces. A conductor pattern 151 for conducting currents is formed on the surface of the upper reflecting mirror 131 and electrode portions 161, 162 are formed at both ends of the conductor pattern 151, where the conductor pattern 151 is formed only on the edge portions of the reflecting mirror 131 and the elastic body 141, and each ends of the conductor pattern 151 is connected with the electrode portions 161, 162. Therefore, the current above the reflecting mirror 131 flows in one rotational direction. In addition, a permanent magnet or electromagnet 181 in a cylindrical shape is installed in the circumference of the upper optical fiber or waveguide 111.

The reflecting mirrors 131, 132 and the elastic body 141 are made of the same or different materials. And, for example, the reflecting mirrors 131, 132 can be a distributed Bragg reflector (DBR), or a two or three dimensional photonic crystal structure. In addition, the reflecting mirrors 131, 132 can be made of any one of a metallic thin film, a dielectric thin film, an organic thin film and a semiconductor thin film, a combination of the aforementioned materials, or a combination of the aforementioned materials and air gaps.

Figure 5:
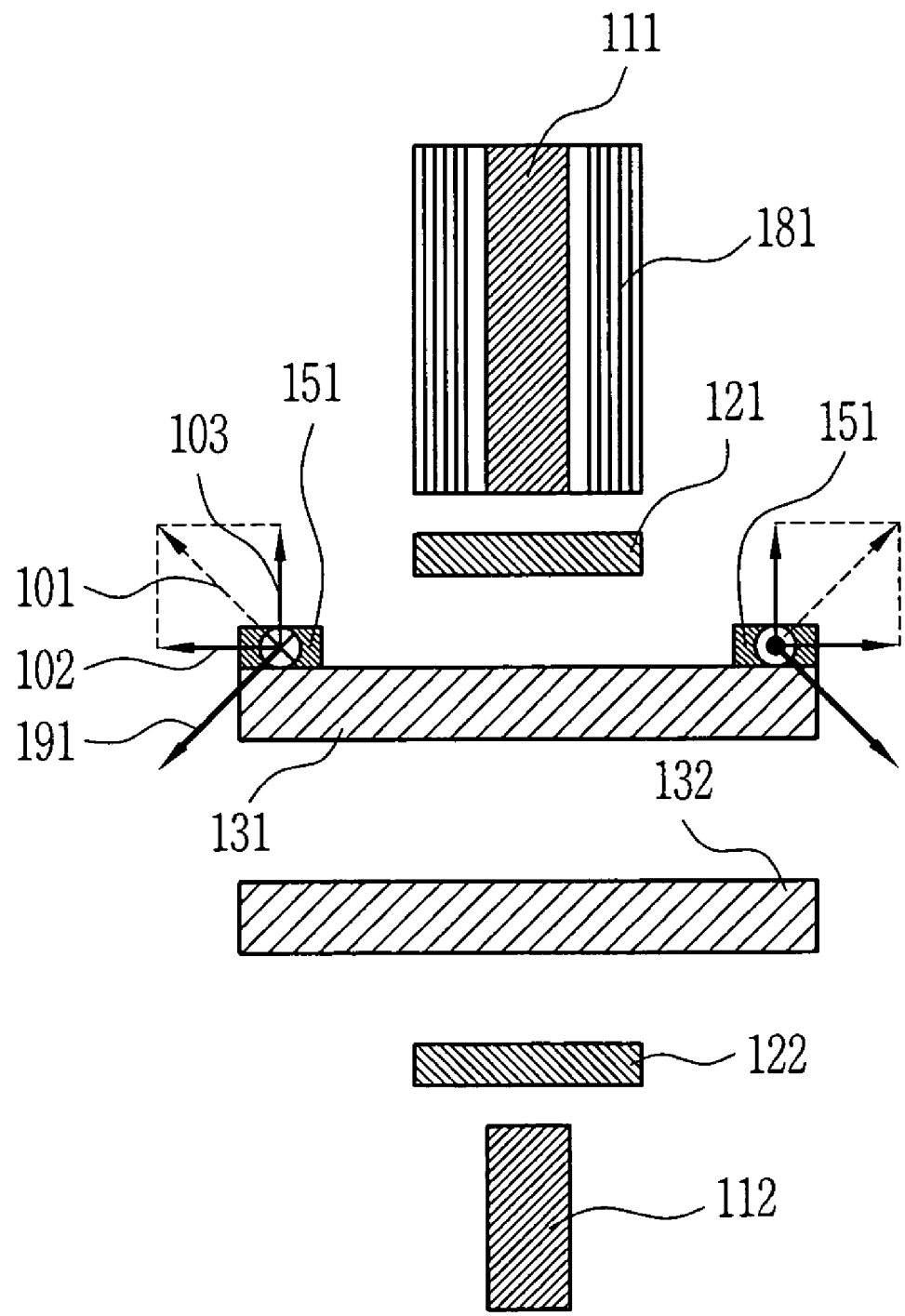
FIG. 5 is a cross sectional side view of the wavelength tunable filter in FIG. 4, taken along the line A–B.

FIG. 5 is a cross sectional side view of the wavelength tunable filter in FIG. 4, taken along the line A-B. In this figure, the line 101 indicates the direction of the force exerted to the flowing current by the magnetic field. The line 102 indicates the component parallel to the reflecting mirror 131 of the electromagnetic force 101 and the line 103 indicates the component perpendicular to the reflecting mirror 131 of the electromagnetic force 101. If the electromagnet or permanent magnet 181 is not large enough to cover the whole exposed section of the upper reflection mirror 131, the force 101 induced by the magnetic field 191 and exerted to the conductor pattern 151 includes the component perpendicular to the reflecting mirror 131 as well as the component parallel to the reflecting mirror 131. Supposing the bottom portion of the electromagnet or permanent magnet 181 corresponds to N-pole, the direction of current flows is into the paper on the left conductor portion, and the direction of current flows is out of the paper on the right conductor portion, that is, the current runs from the right electrode portion 161 through the conductor pattern 151 to the left electrode portion 162, the force components 102 parallel to the surface of the reflecting mirror 131 are opposite each other with respect to the conductor patterns 151 facing each other on the reflecting mirror region 131, whereas the force components 103 perpendicular to the surface of the reflecting mirror 131 act to upper direction with respect to both left and right conductor patterns 151. Subsequently, these forces are summed to move the reflecting mirror 131 to the upper direction. At this point, supposing the distance between the conductor patterns 151 formed on the elastic body 141 is very close, the directions of the exerted magnetic fields are the same and the directions of the currents are opposite so that the induced forces are cancelled. Therefore, they are ignored.

FIG. 5 illustrates the structure for driving only one reflecting mirror 131. However, it is possible to drive two reflecting mirrors 131, 132 independently by manufacturing the opposite reflecting mirror 132 in a symmetrical manner.

Figure 6:
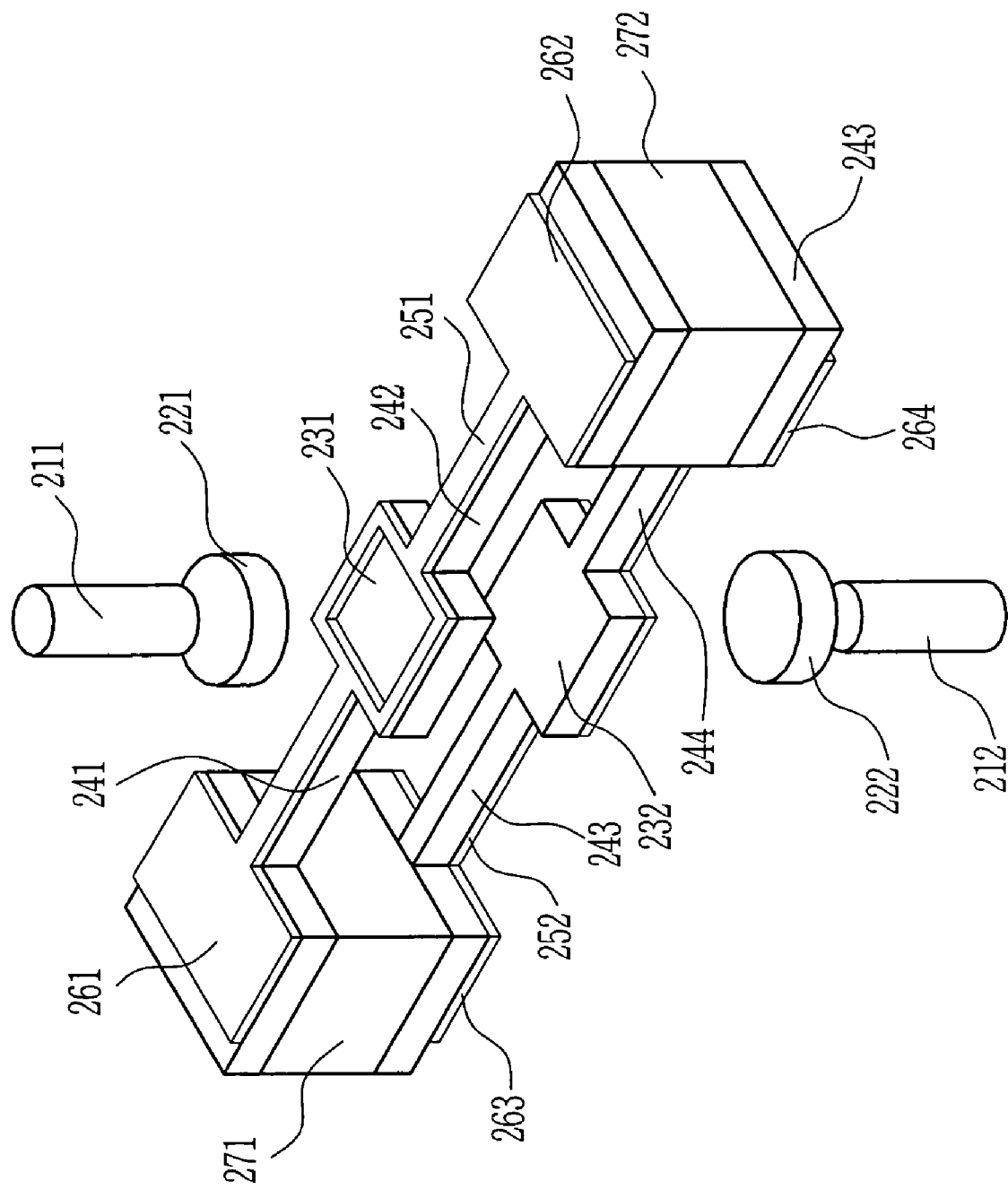
FIG. 6 is a structural diagram showing a wavelength tunable filter capable of being bidirectionally driven according to the fifth embodiment of the present invention.

FIG. 6 is a structural diagram of a wavelength tunable filter driven bidirectionally according to the fifth embodiment of the present invention, in which a wavelength tunable filter is constructed so as to be bidirectionally driven by the currents flowing through the conductor patterns disposed in parallel with each other without using an external electromagnet or permanent magnet in order to produce the magnetic fields.

Two optical fibers or waveguides 211, 212 of which optical axes are aligned are separately situated in a predetermined distance and two lenses 221, 222 for focusing lights are situated at the front ends of the optical fibers or waveguides 211, 212. Between lenses 221, 222, there are a couple of reflecting mirrors 231, 232 facing each other and spaced by air gaps. Both sides of each reflecting mirror 231, 232 are supported by the elastic bodies 241 and 242, 243 and 244, respectively. Spacers 271, 272 are interposed between the elastic bodies 241 and 243, 242 and 244, respectively so that a constant distance is maintained between the reflecting mirrors 231, 232 in the state of no external forces. Conductor patterns 251, 252 for carrying currents are formed on the surfaces of the reflecting mirrors 231, 232 and electrode portions 261 and 262, 263 and 264 are formed at the ends of the conductor patterns 251, 252, respectively.

It is preferable the upper conductor pattern 251 is parallel with the lower conductor pattern 252. If the currents flow through the lower conductor pattern 252, magnetic fields are produced in a concentric shape around the conductor pattern. The magnetic fields rotate along the fingers of a right hand when the thumb points to that of the currents. The produced magnetic fields at the upper conductor pattern 251 are perpendicular to the direction of the upper conductor pattern 251 disposed in parallel with the lower conductor pattern 252. Supposing the current flowing through the upper conductor pattern 251 is designated $i_a$, the current flowing through the lower conductor pattern 252 is designated $i_b$, the distance between conductor patterns 251, 252 is designated d, and permeability of the air gaps is designated $\mu_0$, the force dF exerted to the unit length dL of the conductor pattern can be written as the following equation 3.

$$dF = \frac{\mu_0 i_a i_b}{2\pi d} \quad \text{[Equation 3]}$$

Accordingly, if the currents run through the conductor patterns 251, 252, the reflecting mirrors 231, 232 move according to the principles described above. That is, if currents run through both conductor patterns 251, 252 in the same directions, the reflecting mirrors 231, 232 move closer each other. If currents run through both conductor patterns 251, 252 in the opposite directions, the reflecting mirrors 231, 232 move more distant each other.

Figure 7:
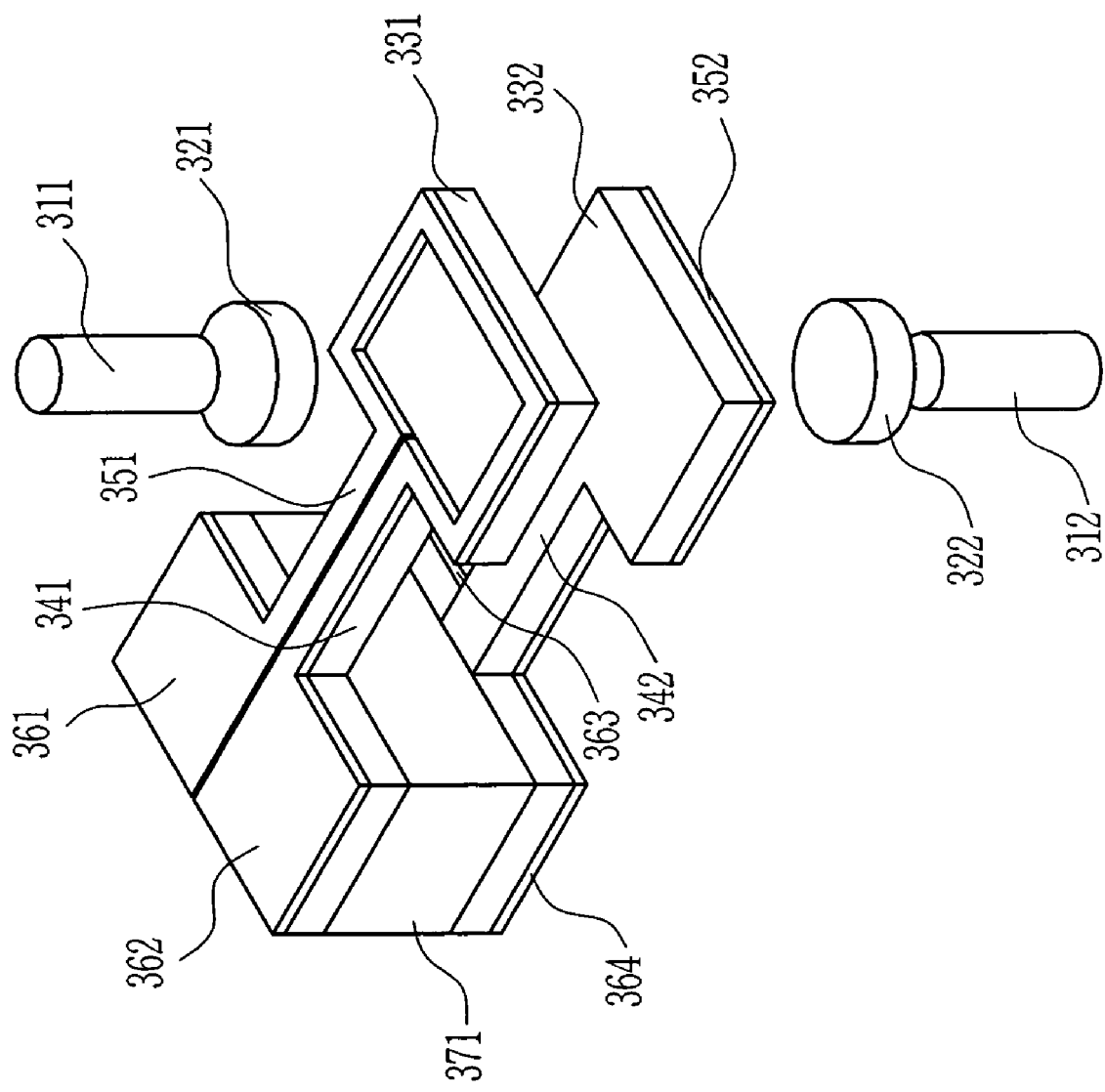
FIG. 7 is a structural diagram showing a wavelength tunable filter capable of being bidirectionally driven according to the sixth embodiment of the present invention.

FIG. 7 is a structural diagram of a wavelength tunable filter driven bidirectionally according to the sixth embodiment of the present invention, in which a wavelength tunable filter is constructed so as to be driven bidirectionally by the currents flowing through the conductor patterns disposed in parallel with each other without an external electromagnet or permanent magnet in order to produce the magnetic field and as a cantilever structure in which only one side of each driven reflecting mirror is supported by the elastic body.

Two optical fibers or waveguides 311, 312 of which optical axes are aligned are separately situated in a predetermined distance and two lenses 321, 322 for focusing lights are situated in the front ends of the optical fibers or waveguides 311, 312. Between lenses 321, 322, there are a couple of reflecting mirrors 331, 332 facing each other and spaced by air gaps. Both reflecting mirrors 331, 332 are aligned with the optical axis and one side of each of reflecting mirrors 331, 332 is supported by the elastic bodies 341, 342. A spacer 371 is interposed between each of ends of the elastic bodies 341, 342 so that a constant distance is maintained between the reflecting mirrors 331, 332 in the state of no external forces. Conductor patterns 351, 352 for carrying currents are formed on the surfaces of the reflecting mirrors 331, 332 and electrode portions 361 and 362, 363 and 364 are formed at the ends of the conductor patterns 351, 352, respectively, where the conductor patterns 351, 352 are formed only on the edge portions of the reflecting mirrors 331, 332 and the elastic bodies 341, 342, so that each current flows in a certain rotational direction on each reflecting mirror 331, 332. Therefore, according to this embodiment, two electrode portions are formed on both upper and lower elastic bodies 341, 342, respectively, so that four electrode portions 361, 362, 363, 364 are formed.

If the currents run through both conductor patterns 351, 352 in the same directions, the reflecting mirrors 331, 332 move closer each other. If the currents run through both conductor patterns 351, 352 in the opposite directions, the reflecting mirrors 331, 332 move more distant each other.

As described above, the wavelength tunable filter according to the present invention can be driven such that the moving directions of the reflecting mirrors can be adjusted to become more distant as well as closer by using the electromagnetic forces induced depending on the directions of the flowing currents. Therefore, in comparison with the conventional wavelength tunable filter driven in only one direction, the maximum forces needed to drive the filter can be lowered to a half and the probability that a pull-in phenomenon occurs can be reduced when it is necessary to have a similar mechanical structure and wavelength tuning range. On the other hand, it is possible to reduce a wavelength change time for the element by making a resonant frequency higher when the same wavelength tuning ranges are used with the same maximum driving forces. Furthermore, in comparison with the conventional method of using the electrostatic force, it is possible to drive the filter with a lower voltage so that it is no need to use an additional high voltage generator.

The present invention has been described with reference to a particular embodiment in connection with a particular application. Those having ordinary skill in the art and access to the teachings of the present invention will recognize additional modifications and applications within the scope thereof.

It is therefore intended by the appended claims to cover any and all such applications, modifications, and embodiments within the scope of the present invention.

What is claimed is:

1. A wavelength tunable filter capable of being bidirectionally driven, comprising:

two optical fibers or waveguides of which optical axes are aligned;

lenses for an input light and an output light disposed between the optical fibers or waveguides;

reflecting mirrors disposed between the lenses, the reflecting mirrors facing each other and being spaced by air gaps;

elastic bodies for supporting the reflecting mirrors;

at least one spacer for maintaining a distance between the reflecting mirrors;

two conductor patterns, each placed on the surface of elastic bodies and reflecting mirrors, the two conductor patterns in parallel with each other;

electrode portions connected with each end of the conductor patterns; and wherein the mirrors are driven to or from each other solely by action of an electromagnetic field generated when current is carried through the two conductor patterns.

2. The wavelength tunable filter capable of being bidirectionally driven according to claim 1, wherein one side of the reflecting mirrors is supported by the elastic bodies.

3. The wavelength tunable filter capable of being bidirectionally driven according to claim 1, wherein both sides of the reflecting mirrors are supported by the elastic bodies.

4. The wavelength tunable filter capable of being bidirectionally driven according to claim 1, wherein the reflecting mirrors is a distributed Bragg reflector, or a two or three dimensional photonic crystalline structure.

5. The wavelength tunable filter capable of being bidirectionally driven according to claim 1, wherein the reflecting mirrors is made of any one of a metallic thin film, a dielectric thin film, an organic thin film and a semiconductor thin film, a combination of the aforementioned materials, or a combination of the aforementioned materials and air gaps.

6. The wavelength tunable filter capable of being bidirectionally driven according to claim 1, wherein some or all portions of the reflecting mirrors and the elastic bodies are made of a doped semiconductor or a conducting material.

7. The wavelength tunable filter capable of being bidirectionally driven according to claim 1, wherein the conductor pattern is formed along the periphery of the elastic bodies and the reflecting mirrors.

8. The wavelength tunable filter capable of being bidirectionally driven according to claim 1, wherein the conductor pattern is made of a conducting material which does not absorb a predetermined wavelength and formed on the some or all portions of the surface of the reflecting mirrors and the elastic bodies.

* * * * *